United States Patent
Tsai

(10) Patent No.: US 8,780,712 B2
(45) Date of Patent: Jul. 15, 2014

(54) SMART AUTOMATIC COMMUNICATION METHOD AND SYSTEM

(71) Applicant: Jonathan Tsai, Seattle, WA (US)

(72) Inventor: Jonathan Tsai, Seattle, WA (US)

(73) Assignee: Fluiditech IP Limited, Victoria, Mahe (SC)

( * ) Notice: Subject to any disclaimer, the term of this patent is extended or adjusted under 35 U.S.C. 154(b) by 112 days.

(21) Appl. No.: 13/693,727

(22) Filed: Dec. 4, 2012

(65) Prior Publication Data

US 2014/0153455 A1 Jun. 5, 2014

(51) Int. Cl.
*H04L 12/28* (2006.01)
*H04W 4/00* (2009.01)
*H04B 7/00* (2006.01)
*G06F 15/16* (2006.01)

(52) U.S. Cl.
CPC .................................... *H04W 4/008* (2013.01)
USPC ........ 370/230; 370/252; 370/338; 370/395.2; 455/41.2; 709/227

(58) Field of Classification Search
USPC ......... 370/254–258, 310, 315–316, 328–332, 370/338, 341, 400–401, 464–468; 455/431–444, 446–466; 709/227–237
See application file for complete search history.

(56) References Cited

U.S. PATENT DOCUMENTS

| 7,969,954 | B2 * | 6/2011 | Abhishek et al. | 370/338 |
| 8,265,052 | B2 * | 9/2012 | Abhishek et al. | 370/338 |
| 2008/0181186 | A1 * | 7/2008 | Rofougaran | 370/338 |
| 2012/0307875 | A1 * | 12/2012 | Maguire | 375/219 |
| 2013/0308581 | A1 * | 11/2013 | Rofougaran | 370/329 |
| 2014/0043979 | A1 * | 2/2014 | Etemad et al. | 370/237 |

* cited by examiner

*Primary Examiner* — Tri H Phan
(74) *Attorney, Agent, or Firm* — Tim Tingkang Xia, Esq.; Morris Manning & Martin LLP

(57) ABSTRACT

A smart automatic communication method and system are introduced. The method applies to a first electronic device and a second electronic device. The first electronic device has a first near field communication chip and a first far field communication chip. The second electronic device has a second near field communication chip and a second far field communication chip. The first electronic device generates a communication packet having therein a communication setup file. The first electronic device moves toward the second electronic device until the first near field communication chip can trigger the second near field communication chip within a short distance. The communication packet is sent from the first electronic device to the second electronic device. The second electronic device analyzes the communication packet to obtain the communication setup file, thereby creating a first far field communication path between the first and second far field communication chips.

11 Claims, 6 Drawing Sheets

SMART AUTOMATIC COMMUNICATION METHOD AND SYSTEM

FIELD OF THE INVENTION

The present invention relates to smart automatic communication methods and systems, and more particularly, to a smart automatic communication method and system for use in communication between electronic devices each having a near field communication chip and a far field communication chip.

BACKGROUND OF THE INVENTION

According to the prior art, to enable electronic devices to be capable of performing communication in various forms, the electronic device is equipped with a plurality of communication chips therein. In this regard, the communication chips are of two types, namely near field communication chips and far field communication chips, depending on the communication distance.

In general, near field communication refers to transmitting data for a short distance (for example, 10 centimeters~10 meters), whereas far field communication refers to transmitting data for a long distance (for example, longer than or equal to 10 centimeters). Hence, when it comes to data transmission performed by an electronic device, near field communication requires less power than far field communication.

In general, near field communication involves creating a near field communication path by means of the contact of induction coils, whereas far field communication requires no contact but involves matching an electronic device with another electronic device which serves as the destination of the data being transmitted.

Accordingly, it is imperative to provide a device that overcomes the aforesaid drawbacks of the prior art.

SUMMARY OF THE INVENTION

It is an objective of the present invention to provide a smart automatic communication method whereby a first electronic device and a second electronic device can switch from near field communication to far field communication easily.

Another objective of the present invention is to provide the smart automatic communication method which involves creating a first far field communication path between the first electronic device and the second electronic device and then creating a second far field communication path between the first electronic device and a third electronic device by means of the second electronic device.

Yet another objective of the present invention is to provide a smart automatic communication system whereby, after a first near field communication path has been created between a first electronic device and a second electronic device and adapted for near field communication, the first electronic device and the second electronic device switch from near field communication to far field communication and form a first far field communication path therebetween.

In order to achieve the above and other objectives, the present invention provides a smart automatic communication method for use with a first electronic device and a second electronic device. The first electronic device has a first near field communication chip and a first far field communication chip. The second electronic device has a second near field communication chip and a second far field communication chip. The method comprises the steps of: generating a communication packet from the first electronic device to package a communication setup file of the first far field communication chip in the communication packet; moving the first electronic device toward the second electronic device to allow the first near field communication chip to trigger the second near field communication chip within a distance and create a first near field communication path between the first near field communication chip and the second near field communication chip; sending the communication packet to the second electronic device through the first near field communication path; analyzing the communication packet with the second electronic device to fetch and send the communication setup file to the second far field communication chip; and creating a first far field communication path between the second far field communication chip and the first far field communication chip according to the communication setup file.

In order to achieve the above and other objectives, the present invention further provides a smart automatic communication system. The system comprises a first electronic device and a second electronic device. The first electronic device has a first processing unit, a first near field communication chip and a first far field communication chip. The first processing unit connects the first near field communication chip and the first far field communication chip. The first processing unit generates a communication packet. The first near field communication chip of the first electronic device sends the communication packet. A communication setup file of the first far field communication chip is packaged in the communication packet. The second electronic device has a second near field communication chip, a second processing unit and a second far field communication chip. The second processing unit connects the second near field communication chip and the second far field communication chip. The second electronic device is connected to the first electronic device via the second near field communication chip for receiving the communication packet. The second processing unit analyzes the communication packet to obtain the communication setup file. A first far field communication path is created between the second far field communication chip and the first far field communication chip according to the communication setup file.

Compared with the prior art, the present invention provides a smart automatic communication system whereby a plurality of electronic devices activates far field communication chips by means of near field communication chips to thereby reduce the required quantity of the electronic devices and facilitate far field communication therebetween.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
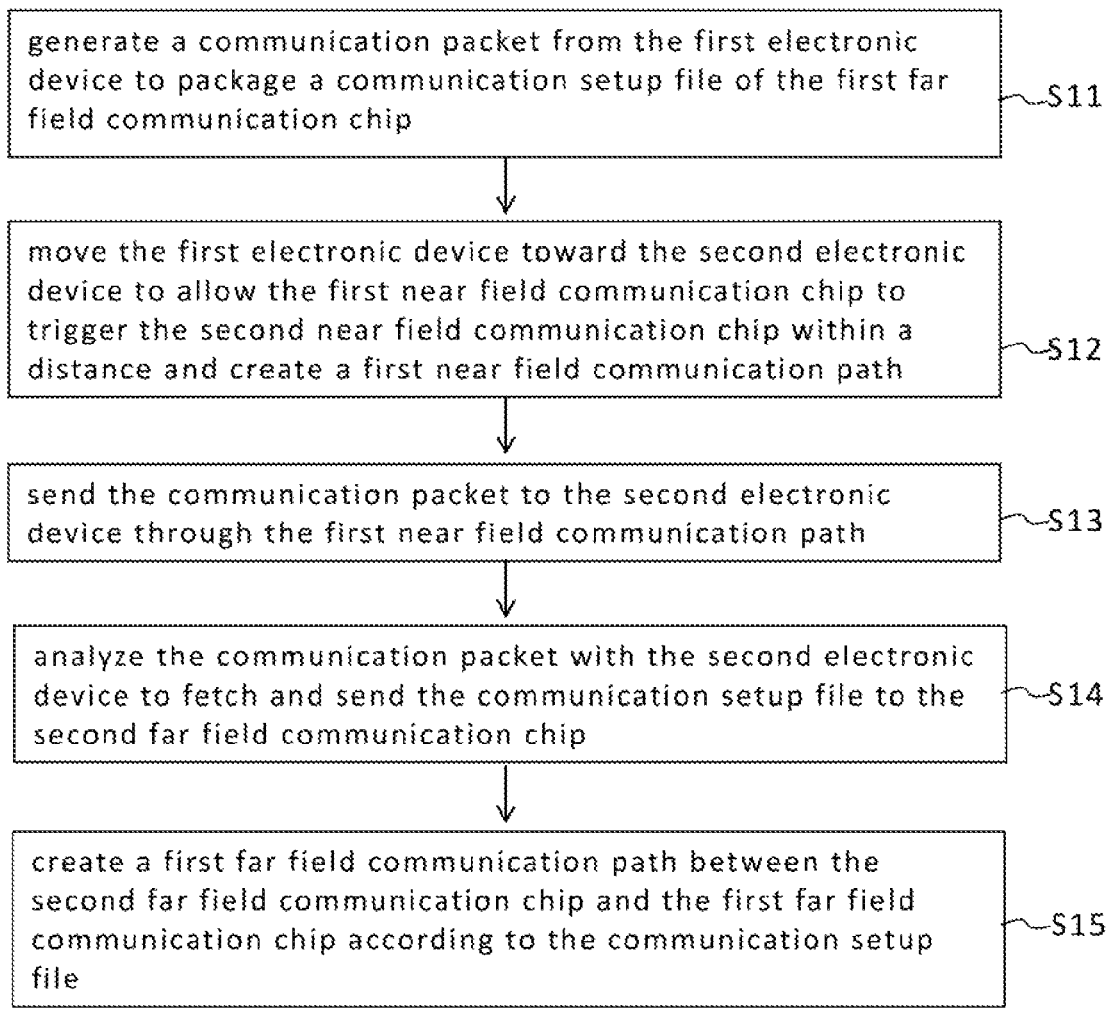
FIG. 1 is a schematic view of the process flow of a smart automatic communication method according to the first embodiment of the present invention.

Referring to FIG. 1, there is shown a schematic view of the process flow of a smart automatic communication method according to the first embodiment of the present invention. As shown in FIG. 1, the smart automatic communication method are for use with a first electronic device and a second electronic device, wherein the first electronic device has a first near field communication chip and a first far field communication chip, whereas the second electronic device has a second near field communication chip and a second far field communication chip.

The process flow of the smart automatic communication method starts with step S11 which involves generating a communication packet by the first electronic device to package a communication setup file of the first far field communication chip.

Step S12 involves moving the first electronic device toward the second electronic device to allow the first near field communication chip to trigger the second near field communication chip within a distance and create a first near field communication path between the first near field communication chip and the second near field communication chip. For example, the distance is shorter than 10 centimeters, wherein the first near field communication chip complies with a near field communication protocol. For example, the distance is shorter than 10 meters, wherein the first near field communication chip complies with a Bluetooth communication protocol.

Step S13 involves sending the communication packet to the second electronic device through the first near field communication path.

Step S14 involves analyzing the communication packet with the second electronic device to obtain the communication setup file and then sending the communication setup file to the second far field communication chip.

Step S15 involves creating a first far field communication path between the second far field communication chip and the first far field communication chip according to the communication setup file, thereby allowing the first electronic device and the second electronic device to switch from the near field communication to the far field communication.

Figure 2:
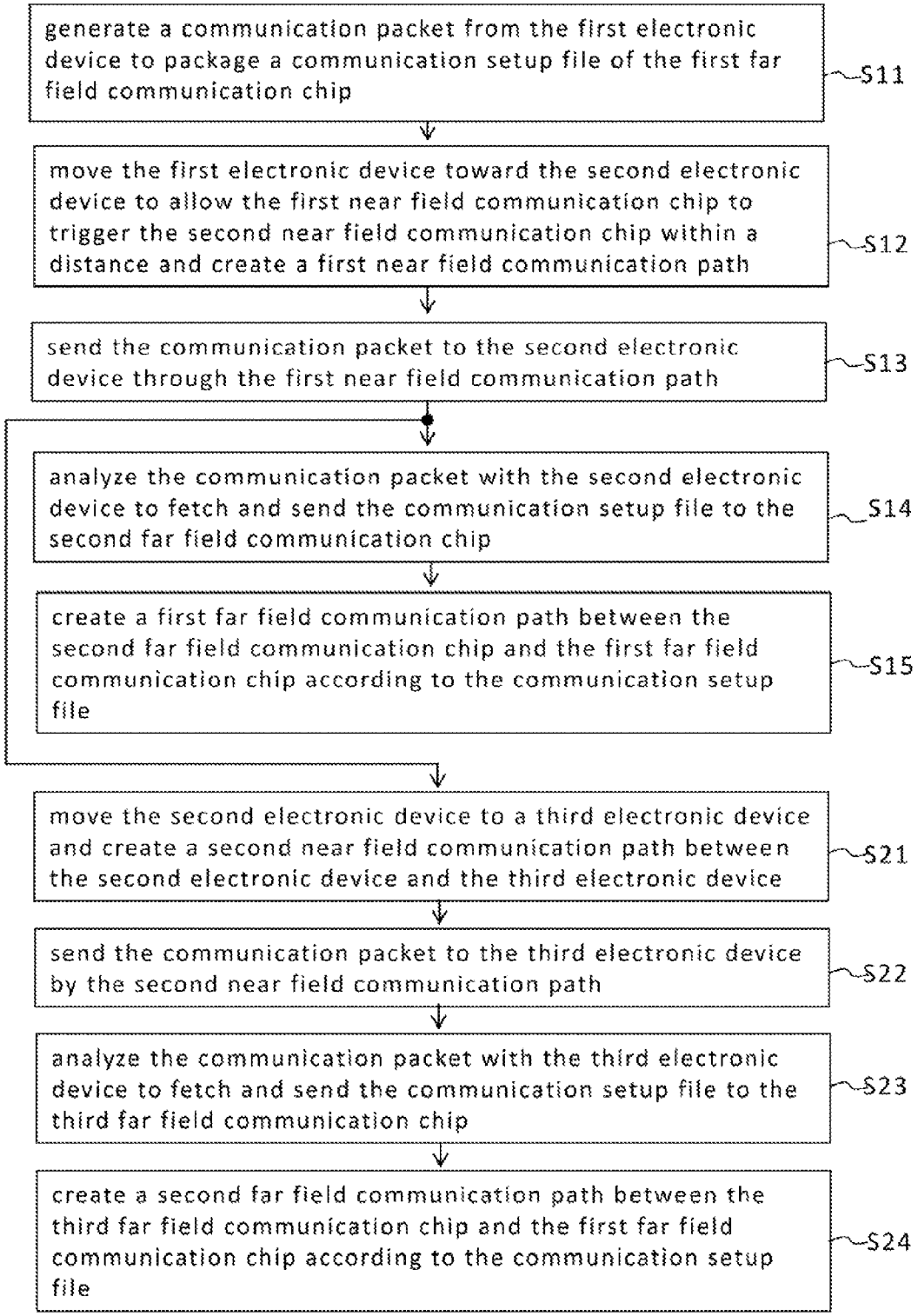
FIG. 2 is a schematic view of the process flow of the smart automatic communication method according to the second embodiment of the present invention.

Referring to FIG. 2, there is shown a schematic view of the process flow of the smart automatic communication method according to the second embodiment of the present invention. As shown in FIG. 2, the smart automatic communication method is for use with a first electronic device, a second electronic device and a third electronic device, wherein the first electronic device has a first near field communication chip and a first far field communication chip, whereas the second electronic device has a second near field communication chip and a second far field communication chip. The third electronic device has a third near field communication chip and a third far field communication chip.

In the second embodiment, the smart automatic communication method not only comprises steps S11~S15 in FIG. 1 but also comprises steps S21~S24.

Step S21 follows step S13 and involves moving the second electronic device to the third electronic device and creating a second near field communication path by means of the second near field communication chip and the third near field communication chip of the third electronic device.

Step S22 involves sending the communication packet to the third electronic device by the second near field communication path.

Step S23 involves analyzing the communication packet by the third electronic device to fetch and send the communication setup file to the third far field communication chip.

Step S24 involves creating a second far field communication path between the third far field communication chip and the first far field communication chip according to the communication setup file. For example, the second far field communication path is the Internet.

Figure 3:
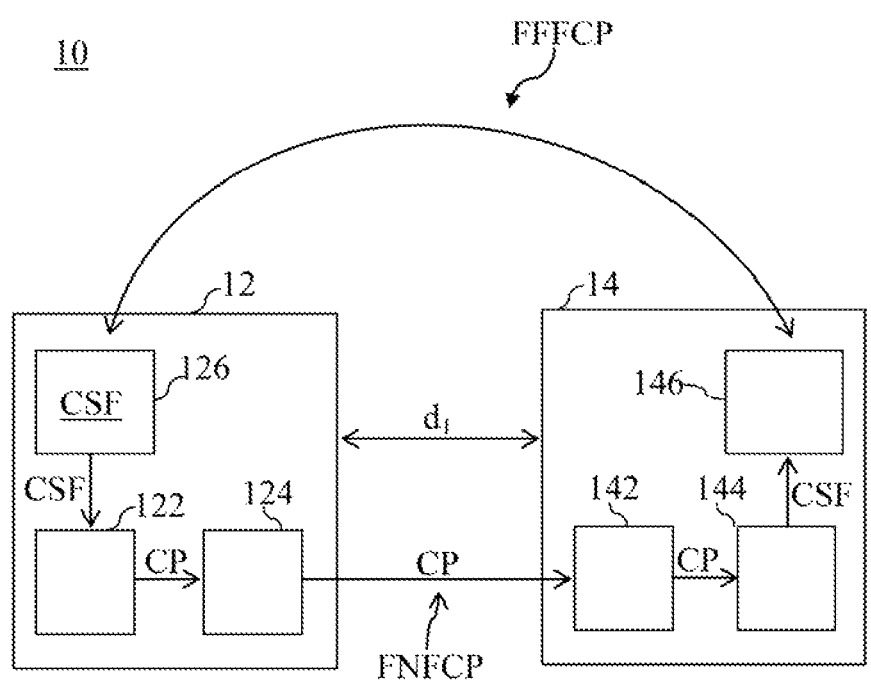
FIG. 3 is a schematic block diagram of a smart automatic communication system according to the first embodiment of the present invention.

Referring to FIG. 3, there is shown a schematic block diagram of a smart automatic communication system according to the first embodiment of the present invention. As shown in FIG. 3, a smart automatic communication system 10 comprises a first electronic device 12 and a second electronic device 14. For example, the first electronic device 12 and the second electronic device 14 are exemplified by a smart mobile device, a tablet computer, or a notebook computer.

The first electronic device 12 has a first processing unit 122, a first near field communication chip 124, and a first far field communication chip 126. The first processing unit 122 connects the first near field communication chip 124 and the first far field communication chip 126. The first processing unit 122 generates a communication packet CP. The communication packet CP is sent from the first near field communication chip 124 of the first electronic device 12. A communication setup file CSF of the first far field communication chip 126 is packaged in the communication packet CP.

The second electronic device 14 has a second near field communication chip 142, a second processing unit 144, and a second far field communication chip 146. If the distance between the first electronic device 12 and the second electronic device 14 does not exceed (for example, when the distance is shorter than or equal to) a distance $d_1$ (for example, when the distance is shorter than 10 centimeters or shorter than 10 meters), the first near field communication chip 124 will trigger the second near field communication chip 142 to create a first near field communication path FNFCP.

The second processing unit 144 connects the second near field communication chip 142 and the second far field communication chip 146. The second near field communication chip 142 enables the second electronic device 14 and the first electronic device 12 to connect with each other and thereby receive the communication packet CP. The second processing unit 144 analyzes the communication packet CP to obtain the communication setup file CSF. The second far field communication chip 146 and the first far field communication chip 126 form a first far field communication path FFFCP therebetween according to the communication setup file CSF.

The first near field communication chip 124 and the second near field communication chip 142 comply with a near field communication protocol or a Bluetooth communication protocol. The first near field communication chip 124 and the second near field communication chip 142 perform near field communication under the same communication protocol.

Furthermore, the first far field communication chip 126 and the second far field communication chip 146 comply with at least one of a Bluetooth communication protocol, a Wi-Fi communication protocol, and a wireless universal serial bus protocol.

Figure 4:
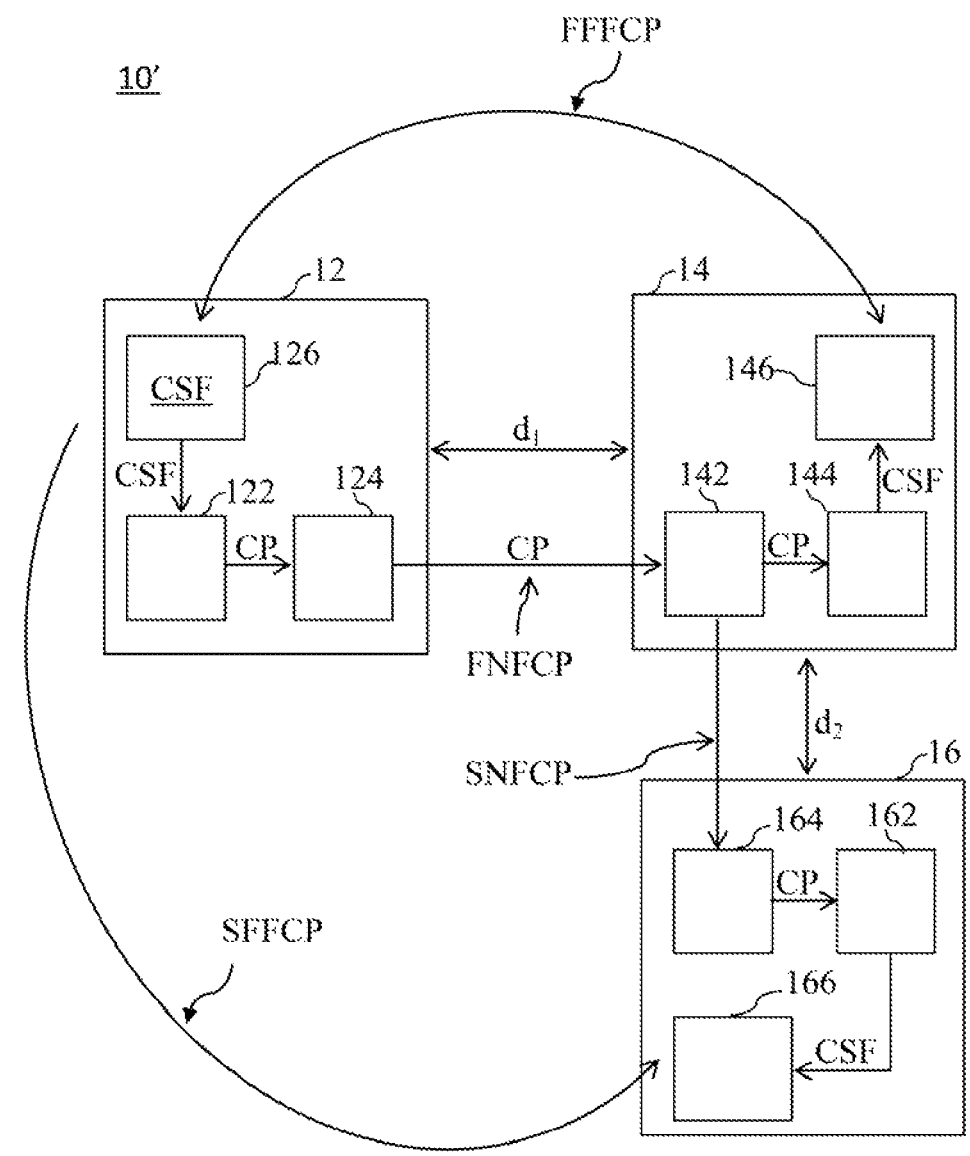
FIG. 4 is a schematic block diagram of a smart automatic communication system according to the second embodiment of the present invention.

Referring to FIG. 4, there is shown a schematic block diagram of the smart automatic communication system according to the second embodiment of the present invention. As shown in FIG. 4, a smart automatic communication system 10' not only comprises the first electronic device 12 and the second electronic device 14 which are shown in FIG. 3, but also comprises a third electronic device 16.

The third electronic device 16 has a third processing unit 162, a third near field communication chip 164 and a third far field communication chip 166.

If the distance between the second electronic device 14 and the third electronic device 16 does not exceed a distance $d_2$ (for example, when the distance is shorter than 10 centimeters or 10 meters), the second near field communication chip 142 will trigger the third near field communication chip 164 for creating a second near field communication path SNFCP.

The third processing unit 162 connects the third near field communication chip 164 and the third far field communication chip 166. The third electronic device 16 is connected to the second electronic device 14 through the third near field communication chip 164, so as to receive the communication packet CP received by the second processing unit 144. Furthermore, the third processing unit 162 analyzes the communication packet CP so as to obtain the communication setup file CSF. A second far field communication path SFFCP is formed between the third far field communication chip 162 and the first far field communication chip 126 according to the communication setup file CSF. For example, the second far field communication path SFFCP is the Internet.

Figure 5:
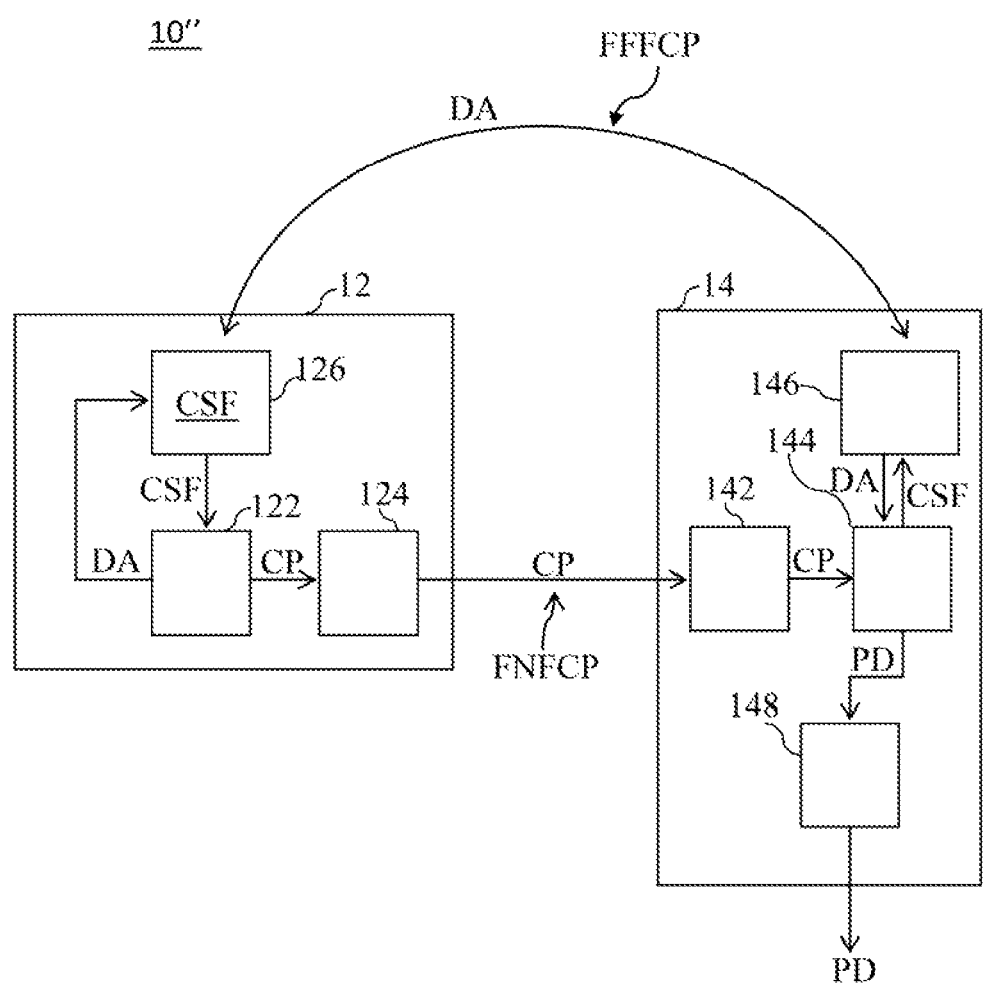
FIG. 5 is a schematic block diagram of a smart automatic communication system according to the third embodiment of the present invention.

Referring to FIG. 5, there is shown a schematic block diagram of a smart automatic communication system according to the third embodiment of the present invention. As shown in FIG. 5, a smart automatic communication system 10" comprises the first electronic device 12 and a second electronic device 14'. The first electronic device 12 shown in FIG. 5 is identical to the first electronic device 12 depicted in FIG. 3 and thus is not reiterated hereunder for the sake of brevity.

The second electronic device 14' has the second near field communication chip 142, the second processing unit 144, the second far field communication chip 146, and a first image projecting unit 148.

The first image projecting unit 148 projects projected data PD, which is generated from the second processing unit 144, to a carrier (not shown). Data DA related to the first electronic device 12 and fetched from the first far field communication path FFFCP is converted into the projected data PD by the second processing unit 144.

Figure 6:
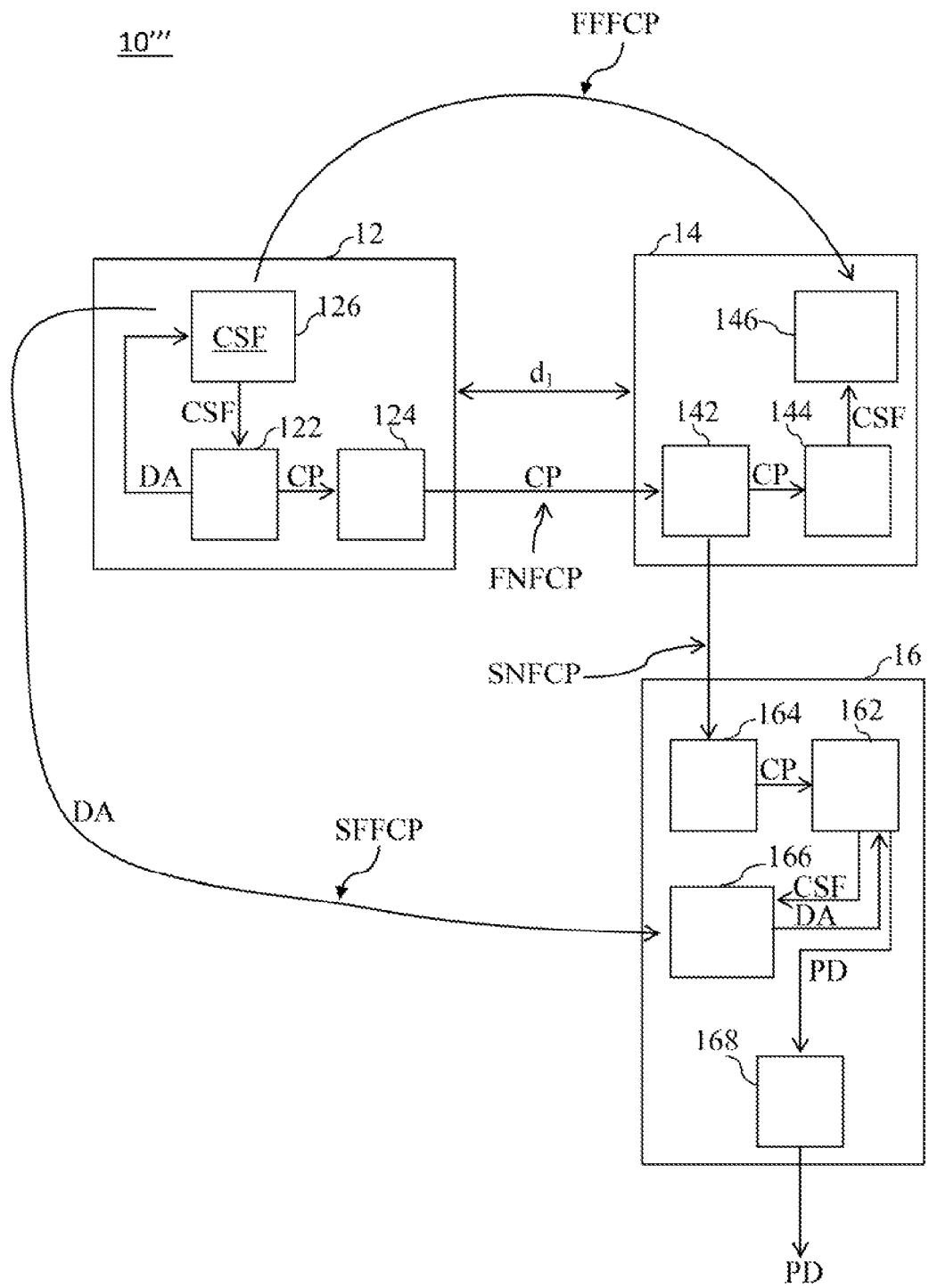
FIG. 6 is a schematic block diagram of a smart automatic communication system according to the fourth embodiment of the present invention.

Referring to FIG. 6, there is shown a schematic block diagram of the smart automatic communication system according to the fourth embodiment of the present invention. As shown in FIG. 6, a smart automatic communication system 10''' not only comprises the first electronic device 12 and the second electronic device 14' in FIG. 5, but also comprises a third electronic device 16 of a second image projecting unit 168.

Projected data PD generated from the third processing unit 162 is projected to a carrier by the second image projecting unit 168. Data DA related to the first electronic device 12 and fetched from the second far field communication path SFFCP is converted into the projected data PD by the third processing unit 162.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A smart automatic communication method for use with a first electronic device and a second electronic device, the first electronic device having a first near field communication chip and a first far field communication chip, and the second electronic device having a second near field communication chip and a second far field communication chip, the method comprising the steps of:
    generating a communication packet from the first electronic device to package a communication setup file of the first far field communication chip in the communication packet;
    moving the first electronic device toward the second electronic device to allow the first near field communication chip to trigger the second near field communication chip within a distance and create a first near field communication path between the first near field communication chip and the second near field communication chip;
    sending the communication packet to the second electronic device through the first near field communication path;
    analyzing the communication packet with the second electronic device to fetch and send the communication setup file to the second far field communication chip; and
    creating a first far field communication path between the second far field communication chip and the first far field communication chip according to the communication setup file.

2. The smart automatic communication method of claim 1, wherein, after the step of sending the communication packet to the second electronic device through the first near field communication path, the method further comprises the steps of:
    moving the second electronic device to a third electronic device having a third near field communication chip and a third far field communication chip and creating a second near field communication path between the third near field communication chip and the second near field communication chip;
    sending the communication packet to the third electronic device by the second near field communication path;
    analyzing the communication packet with the third electronic device to fetch and send the communication setup file to the third far field communication chip; and
    creating a second far field communication path between the third far field communication chip and the first far field communication chip according to the communication setup file.

3. The smart automatic communication method of claim 2, wherein the first far field communication path and the second far field communication path are the Internet.

4. A smart automatic communication system, comprising:
    a first electronic device having a first processing unit, a first near field communication chip, and a first far field communication chip, the first processing unit connecting the first near field communication chip and the first far field communication chip and generating a communication packet sent from the first near field communication chip, wherein a communication setup file of the first far field communication chip is packaged in the communication packet; and
    a second electronic device having a second processing unit, a second near field communication chip, and a second far field communication chip, the second processing unit connecting the second near field communication chip and the second far field communication chip, the second electronic device being connected to the first electronic device via the second near field communication chip to receive the communication packet, the second processing unit analyzing the communication packet to obtain the communication setup file, thereby creating a first far field communication path between the second far field communication chip and the first far field communication chip according to the communication setup file.

5. The smart automatic communication system of claim 4, further comprising a third electronic device having a third processing unit, a third near field communication chip, and a third far field communication chip, the third processing unit connecting the third near field communication chip and the third far field communication chip, the third electronic device being connected to the second electronic device via the third near field communication chip to receive the communication packet previously received by the second processing unit, the third processing unit analyzing the communication packet to obtain the communication setup file, thereby creating a second far field communication path between the third far field communication chip and the first far field communication chip according to the communication setup file.

6. The smart automatic communication system of claim 5, wherein the first near field communication chip, the second near field communication chip, and the third near field communication chip comply with at least one of a near field communication protocol and a Bluetooth communication protocol.

7. The smart automatic communication system of claim 5, wherein the first far field communication chip, the second far field communication chip, and the third far field communication chip comply with at least one of a Bluetooth communication protocol, a Wi-Fi communication protocol, and a wireless universal serial bus protocol.

8. The smart automatic communication system of claim 5, wherein the first far field communication path and the second far field communication path are the Internet.

9. The smart automatic communication system of claim 5, wherein, when a distance between the first electronic device and the second electronic device does not exceed a predetermined distance value, the first near field communication chip triggers the second near field communication chip for creating the first near field communication path.

10. The smart automatic communication system of claim 5, wherein the third electronic device further comprises a second image projecting unit connected to the third processing unit and adapted to project projected data generated from the third processing unit to a carrier, wherein the third processing unit converts data related to the first electronic device and received from the first far field communication path into the projected data.

11. The smart automatic communication system of claim 4, wherein the second electronic device further comprises a first image projecting unit connected to the second processing unit and adapted to project projected data generated from the second processing unit to a carrier, wherein the second processing unit converts data related to the first electronic device and received from the first far field communication path into the projected data.

* * * * *